United States Patent [19]
Nakawaki

[11] 3,889,977
[45] June 17, 1975

[54] TRAILERS
[75] Inventor: Yoshiharu Nakawaki, Osaka, Japan
[73] Assignee: Kabushiki Kaisha Suehiro Sharyo Seisakusho, Osaka, Japan
[22] Filed: Dec. 7, 1973
[21] Appl. No.: 423,374

[52] U.S. Cl. ............................................. 280/408
[51] Int. Cl. ........................................... B62d 53/00
[58] Field of Search .......... 280/408, 419, 442, 443, 280/446 R, 446 B

[56] References Cited
UNITED STATES PATENTS

| 776,994 | 12/1904 | Brennan | 280/442 X |
| 1,585,753 | 5/1926 | Arato | 280/408 X |
| 2,110,114 | 3/1938 | Smith | 280/446 R |
| 2,124,043 | 7/1938 | Smith | 280/446 R |
| 2,879,079 | 3/1959 | Edwards | 280/446 R |

Primary Examiner—David Schonberg
Assistant Examiner—R. Schrecengost
Attorney, Agent, or Firm—Stevens, Davis, Miller & Mosher

[57] ABSTRACT

A trailer which is adapted to be connected to another trailer by means of couplers and has a control apparatus serving to constantly urge the couplers to be positioned straight forwardly or in the moving direction of the trailer, whereby a train of trailers may be moved by a tractor forwards or backwards in a straight aligned array.

4 Claims, 4 Drawing Figures

TRAILERS

This invention relates to trailers and in particular a construction of trailers which permits a plurality of such trailers connected to one another to run in regularity.

A hitherto known trailer of this type is provided with a so-called traction bar which has an inner end portion connected to a frame of the trailer rotatably in a horizontal plane.

Accordingly, when the trailer is connected to a tractor by way of the traction bar and driven by it, the traction bar tends to swing rotate in the horizontal plane in dependence upon the ground conditions, the driving technique etc., which may eventually cause the trailer to run in a serpentine manner.

Thus, it was difficult to advance or move backwards the trailer in the desired orderly manner.

When a plurality of the prior trailers connected to one another are, for example, to be driven or moved backwards, the foremost tractor must be disconnected from the train of the trailers and connected to the last trailer to thereby tow the trailer train in thereverse direction. The trailer of the conventional construction thus requires labor and time expensive operations to change the tractor connection, and can not rapidly deal with the pressing loading and/or unloading work as is often required in the airport at the landing or take off time, for example.

Accordingly, an object of the present invention is to provide a trailer which has means to constantly urge a rotatable coupler of the trailer into a direction which allows the trailer to run straightforwards, whereby a plurality of trailers connected together to one another can be moved in an orderly manner with the serpentine-like movement excluded.

Now the invention will be described with reference to an embodiment shown in the drawings by way of an example.

Figure 1:
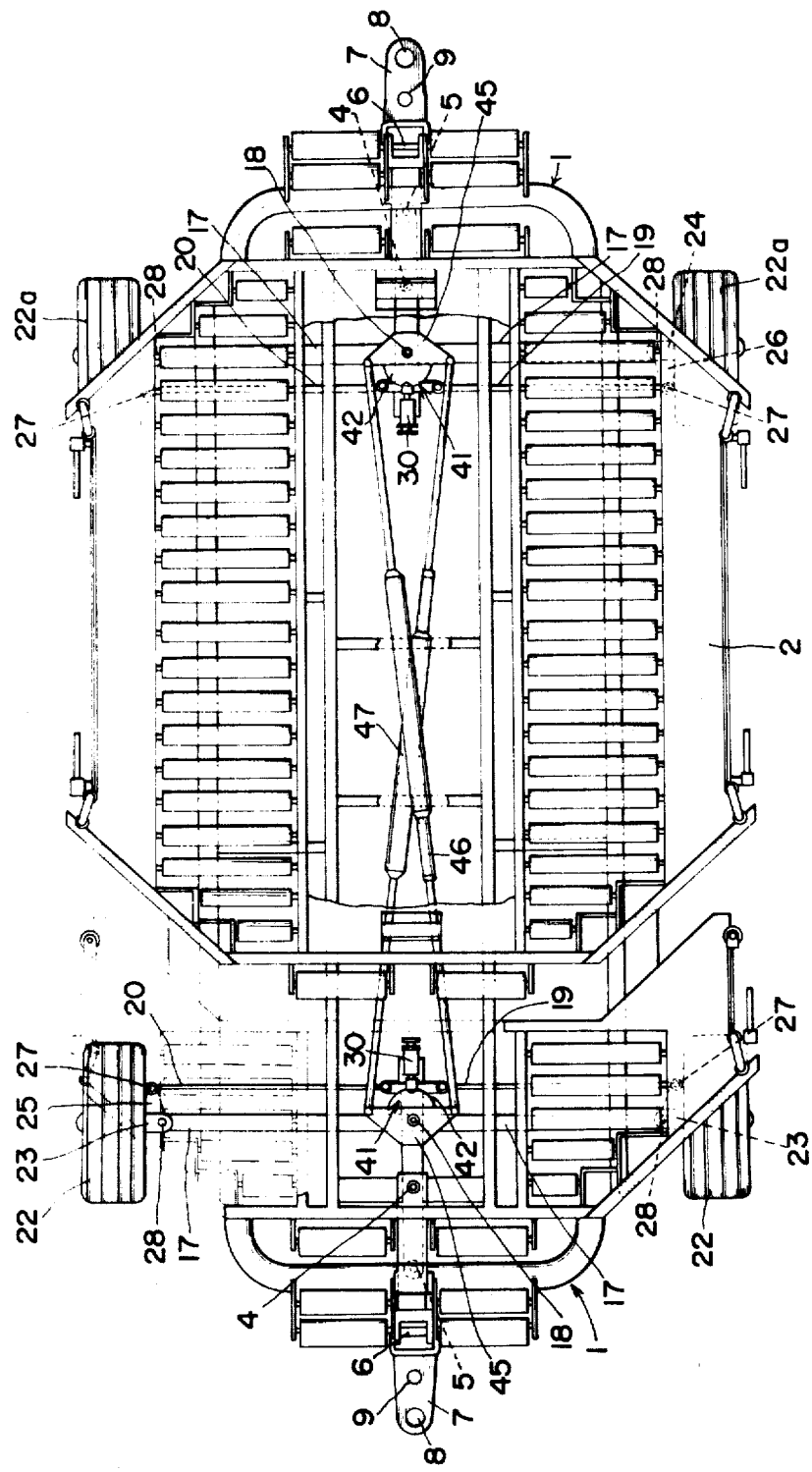
FIG. 1 is a top plan view showing a trailer according to the present invention with portions broken away.

Referring to the drawings, reference numeral 1 indicates a base frame of a trailer which supports rotatably a turn table 2 thereon. The turn table 2 may be of any conventional construction and composed of a plurality of rolls arrayed so as to facilitate the loading and positioning of goods or freight to be transported by the trailer as is schematically illustrated in FIG. 1. The frame 1 has coupling portions 3 fixedly secured thereto at the front and the rear end portions thereof. Each of the coupling portions 3 is of a channel-like or C-shaped configuration in cross-section and supports pivotally a coupler 5 at an inner end thereof by means of a pin 4 so that the coupler may be rotated about the pin 4 in a horizontal plane. The coupler 5 in turn supports at the outer end portion a connector plate 7 by means of a supporting shaft 6 rotatably in a vertical plane.

The connector plate 7 constitutes a part of the coupler 5 and is provided with a connecting opening 8 and a protrusion 9, the dimensions of which are such that the opening 8 may engageably receive a corresponding protrusion of the connector plate 7 of other trailer. It should be appreciated that such coupler arrangements including the connector plates are present both at the front and the rear ends of the frame 1.

Figure 3:
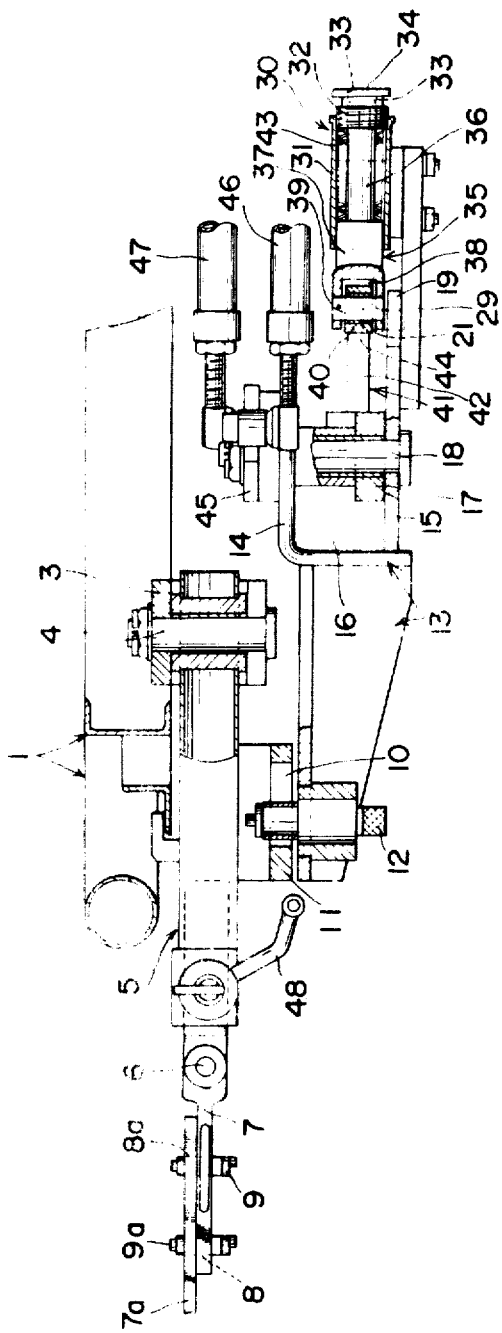
FIG. 3 is a partially broken side view of the same.

Referring particularly to FIG. 3, secured to the coupler 5 at the lower intermediate portion thereof is a suspending member 11 formed with an elongated slot 10, within which a supporting or suspending rod 12 is received. An arm plate 13 is horizontally swingably supported by the rod 12 at an outer end thereof and is bifurcated at the inner end into vertically aligned upper and lower plates 14 and 15 which form therebetween a bearing cavity 16. An axle 17 is disposed within the bearing cavity 16 and mounted to the bifurcated upper and lower plates 14 and 15 by means of a shaft 18 so as to be angularly movable relative to the swingable arm member 13.

Figure 2:
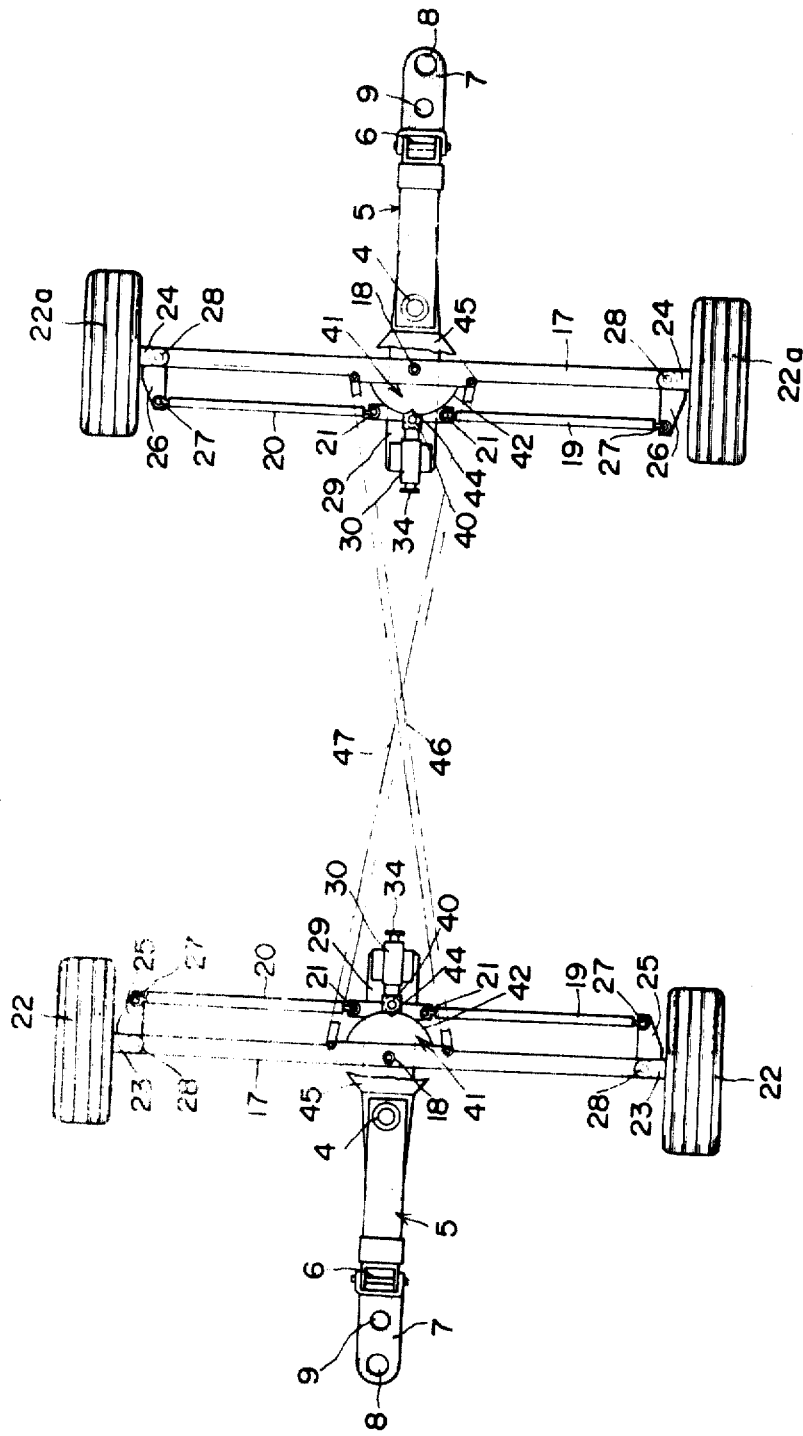
FIG. 2 is a top plan view of a braking mechanism of the trailer shown in FIG. 1.

Actuator rods 19 and 20 are pivotally connected to the lower plate 15 of the swingable arm member 13 at the both sides thereof by means of a pin 21, while the other ends of the actuator rods 19 and 20 are also pivotally connected to supporting arms 25 and 26 by means of pins 27 (refer to FIG. 2), said arms 25 and 26 being integrally formed with the supporting members 23 and 24 for the front wheels 22 and the rear wheels 22a. Furthermore, the axle 17 is rotatably connected to the supporting members 23 and 24 at both ends thereof.

Figure 4:
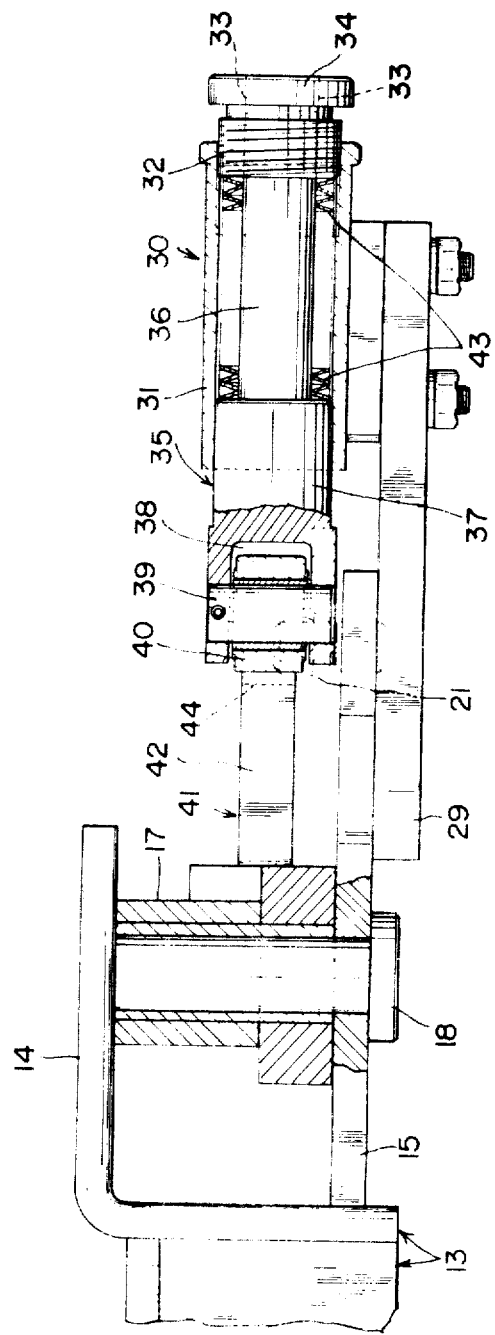
FIG. 4 is an enlarged fractional side view of a controller apparatus mounted on a swingable arm member of the trailer shown in FIG. 1.

A supporting plate 29 is secured to the lower plate 15 of the swingable arm member 13 and a controller 30 for restrictively controlling or braking the rotation of the coupler 5 is fixed on the supporting plate 29. As shown in FIG. 3, this control apparatus 30 comprises a hollow guide member 31 having an inner end to which a lock nut 32 is fixed. An adjusting screw 34 having a guide bore 33 formed therein is screwed into the lock nut 32. A push rod 35 is inserted through the hollow guide member 31 and the inner reduced portion 36 of the rod 35 is displaceably inserted into the guide bore 33 formed in the adjusting screw 34. Formed at the projecting end of the enlarged portion 37 of the push rod 35 projecting outwards from the hollow guides 31 is a bifurcated supporting portion 38 of an inverted C-like cross-section in which a guide roller 40 is disposed rotatably around a supporting shaft 39. The guide roller 40 is disposed to engage a semi-circular arcuate guide surface 42 (FIG. 4) of a guide member 41 fixed to the axle 17. Interposed between the enlarged portion 37 of the push rod 35 having the guide roller 40 and the inner reduced portion 36 of the adjusting screw 34 is a spring means such as a plurality of dish-like springs 43, which spring means exerts a resilient force to usually urge the push rod 35 toward the guide member 41 having the guiding surface 42. As a result, the guide roller 40 of the push rod 35 is usually engaged to a concaved latch portion 44 of the guiding surface 42. The urging force of the spring means 43 applied to the push rod 35 can be adjusted by means of the adjusting screw 34 threaded into the lock nut 32.

The upper plate 14 of the swingable arms 13 arranged at the front and the rear sides in the same manner are provided with fan-like actuator plates 45, 45, respectively, each of which is fixed on the associated plate 13 at one side thereof.

One of the actuator plates 45 is formed with an enlarged extension which serves as a link lever, to which one end of an interlocking or steering rod assembly 46 which is expansible under the resilient force of spring or hydraulic fluid pressure is pivotally connected by means of a shaft, while the other end of the steering rod assembly 46 is connected to a corresponding fan-like link lever of the other actuator plate 45 by means of a shaft. In the drawings, the one actuator plate 45 is disposed at the left hand side, while the said other actuator plate is shown at the right hand side as viewed in FIG. 1. The steering rod assembly 46 is disposed angularly to the longitudinal center axis and passes through substantially a central or middle portion of the trailer. It must also be pointed out that the steering or interlocking rod assembly 46 is positioned below the frame 1. Disposed symmetrically and intersecting the steering rod assembly 46 is another similar expansible interlocking or steering rod assembly 47 which is pivotally connected to the other fan-like link lever of the left hand actuator plate 45 by means of a connecting shaft, while the other end of the steering rod assembly 47 is swingably linked to a similar fan-like lever arm of the right hand actuator plate 45 by means of a stud. Of course, the steering rod assembly 47 is also disposed below the frame 1 with the same angle to the longitudinal axis of the trailer as the before mentioned steering rod assembly 46. In this manner, a pair of the steering or interlocking assemblies 46, 47 geometrically intersect each other between the actuater plates 45, 45 as viewed from the above in FIG. 1.

For coupling two or more trailers to one another, the connecting plate 7 of the coupler provided at the rear end of the preceding trailer is placed on or under the corresponding connecting plate 7a of the coupler 5 of the following trailer and the protrusions 9 and 9a formed in the connecting plates 7 and 7a are fitted into the openings 8 and 8a, thereby connecting together the couplers 5 of the succeeding trailers. In this manner, a desired number of trailers can be easily connected in series to one another to form a train. Of course, the foremost trailer in the train is coupled to a towing vehicle such as a tractor (not shown) by using the connecting plate 7 of the coupler 5 in the same manner. It is to be noted that the guide roller 40 of the push rod 35 is engaged into the notched portion 44 formed in the guide member 41 fixed to the axle 17 to thereby position the coupler 5 in the towed direction perpendicular to the axle 17 through the swingable member 13. Thus, the desired number of the trailers are now in the state to be moved by a tractor running along a straight path. During the movement of the train along a straight path, the front and the rear wheels 22 and 22a of the individual trailer are maintained in a balanced condition by the cooperation of the actuator rods 19 and 20 and the steering or interlocking rod assemblies 46 and 47.

When the ground condition is unfavourable, the wheels 22 may effect lateral swinging movement. In such case, the axle 17 of the wheels as well as the guide member 41 fixed to the axle 17 will be rotated against the force of the spring 43 of the control apparatus 30, and the guide roller 40 of the control apparatus 30 which constantly engages the guide plate 41 may temporarily be moved out of the concaved latch portion 44 of the guide plate 41 to engage the arcuate guiding surface 42 at a side of the concaved portion 44. However, due to the urging or biasing force of the spring means 43 provided at the control apparatus 30, the guide roller 40 will return to the concaved latch or engaging portion 44 from the arcuate guide surface 42, as the trailer moves, to thereby restore the guide member 41 to the original position. As a result, the laterally swung wheels 22 may resume the straight forward direction.

When the tractor is stopped, every coupler connected to every tractor is forcibly positioned into the straight-forwards towed direction by the push rod 35 engaging the concaved latch portion 44 of the guide member 41, whereby all the trailers are stopped in a straight aligned array.

When a plurality of the trailers are to be moved backwards, there is no necessity to disconnect the foremost tractor. It is sufficient merely to drive the tractor backwards. The coupler 5 of the foremost trailers is held stationary without making any horizontal swings by the respective control apparatus 30 which engages the concaved portion 44 of the guide member 41 of the axle 17. All the other couplers 5 of the succeeding trailers remain in the same position. Thus, with the backward movement of the tractor, all the trailers can be moved backwards, as progressively or successively pushed by the tractor in a substantially linear alignment.

In case that a train of trailers which runs forwards and particularly at a relatively high speed is to be stopped, the stopping of the trailers will occur in sequence beginning with the foremost trailer and ending at the last trailer, with the preceding trailers being subjected to the pushing force of the succeeding trailers by way of the couplers 5 due to the inertia of movement of the latter. In such case, every coupler 5 tends to rotate about a pin 4, and the guide roller 40 of the control apparatus 30 provided by way of the swingable arm member 13 will then be disengaged from the concaved latch portion 44 formed in the guide member 41 for the axle 17 and move onto either one of the arcuate guiding surfaces 42 formed in the guide member 41. With the swing or rotation of the couplers 5 which serves to absorb the inertial pushing force for stopping the individual trailers successively, the pair of interlocking or steering rod assemblies 46 and 47 which are connected to the swingable arm plates 13 will position the wheels 22 and 22a inclined with a certain angle between the running direction of the wheels and the longitudinal axis of the respective trailers.

However, it is nevertheless possible to move the train of the trailers backwards, starting from the above state with the wheels being angularly positioned relative to the straight moving direction. In other words, even if the train of trailers has been stopped in a serpentine manner out of alignment with the wheels being angularly positioned as above mentioned, the train can still be effectively moved backwards. More specifically, as the train of the trailer begins to run backwards under the pushing force of the tractor, the guide roller 40 will progressively be displaced from the arcuate guiding surface 42 of the guide member 41 to the centrally disposed concaved latch portion 44 under the urging or biasing force of the spring means 43 provided in the control apparatus, thereby moving gradually the inclined coupler 5, into the straightforward direction, whereby the running direction of the wheels 22 and 22a may also be corrected by the interlocking rod assemblies 46 and 47 which are operated by the swingable arm member 13, until all the trailers have been moved backwards in a linearly aligned array.

In the foregoing description, the invention has been described with reference to a so-called knuckled type of trailer having four wheels composed of a pair of interlocking or steering rod assemblies 46 and 47. However, the inventive idea of this invention can be equally applied to the knuckled type of trailer provided with two wheels.

Reference numeral 48 indicates a stopper displaceably mounted in the coupler 5 to limit the movement of the connecting plate 7.

In summary, the principal idea of the present invention resides in the provision of a control apparatus which resiliently engages with the guide surface of a guide member for restricting or braking the rotation of the coupler of the trailer so as to constantly urge the trailer or trailers to move in the straightforward directions. A plurality of trailers each being provided with the control apparatus according to the invention can be moved in a linearly aligned array not only in the forward direction but also in the backward direction substantially independently from the running conditions. Particularly in case the train of the trailers is intended to be moved back, it is not necessary to change the position of the tractor. It is sufficient merely to drive the tractor backward to thereby push the trailers, which can then be moved in a linearly aligned manner without the possiblility of trailers being deviated serpentinely.

Furthermore, even if many trailers are connected together, the individual trailer can be easily turned. Accordingly, the transportation works may be carried out efficiently in compliance with the running or driving conditions. Thus, the trailers according to the invention can be advantageously employed at the place whee rapid operations are required as in the airport.

Although a preferred embodiment has been illustrated and described, it is apparent to those skilled in the art that many various modifications may be made in the form of the invention without departing from the spirit and scope of the invention.

What is claimed is:

1. A trailer comprising, a frame, couplers connected rotatably in a horizontal plane to said frame, swingable members connected rotatably in a horizontal plane to said couplers respectively, axles supported by said swingable members, guide means fixed to said axles respectively and having arcuate guide surfaces, control means provided with said swingable members and each having a guide roller engaging resiliently with said arcuate guide surface to control the rotation of said couplers, and adjusting screws provided with said control means to adjust a force applied to said guide rollers.

2. A trailer comprising, a frame, a pair of couplers connected rotatably in a horizontal plane to said frame at the front and rear end portions of said frame, swingable members each connected rotatably in a horizontal plane to each of said couplers, axles supported by said swingable members, guide means fixed to said axles, respectively and having arcuate guide surfaces, control means provided with said swingable members and each having a guide roller engaging resiliently with said arcuate guide surface to control the rotation of said couplers, adjusting screws provided with said control means to adjust a force applied to said guide rollers actuator plates fixed to the inner ends of the swingable members, and a pair of rod assemblies connected rotatably at both ends thereof to said actuator plates in an interconnecting array.

3. A trailer comprising, a frame, front and rear couplers connected rotatably in a horizontal plane to said frame at the front and rear end portions of said frame, said couplers each having a forward portion rotatable in a vertical plane, swingable members each connected at its forward end roatably in a horizontal plane to each middle portion of said couplers, bearing cavities each formed by upper and lower plates at the backward portion of each swingable member, axles each supported rotatably by a shaft in each bearing cavity, guide members each fixed to each axle and having an arcuate guide surface, control means each having a guide roller engaging resiliently with said arcuate guide surface of said guide member at an attended part of said lower plate of said swingable member for controlling the rotation of said coupler by urging resiliently and normally said guide roller to said arcuate guide surface, actuator plates each fixed to said upper plates of each swingable member, and a pair of rod assemblies connected rotatably at both ends thereof to said actuator plates in an interconnecting array.

4. A trailer as set forth in claim 3, further comprising an adjusting screw for adjusting a force applied to said guide roller of said control means.

* * * * *